Feb. 26, 1957 R. M. SHAW, JR 2,782,832

BENDING MACHINES

Filed April 26, 1955 7 Sheets-Sheet 1

INVENTOR.
Ralph M. Shaw, Jr,
BY Paul & Paul
ATTORNEYS.

Feb. 26, 1957 R. M. SHAW, JR 2,782,832

BENDING MACHINES

Filed April 26, 1955 7 Sheets-Sheet 2

INVENTOR:
Ralph M. Shaw, Jr.,
BY Paul & Paul
ATTORNEYS.

BENDING MACHINES

Filed April 26, 1955 7 Sheets-Sheet 3

INVENTOR:
Ralph M. Shaw, Jr.,
BY Paul & Paul
ATTORNEYS.

INVENTOR:
Ralph M. Shaw, Jr.,
BY Paul & Paul
ATTORNEYS.

Feb. 26, 1957 R. M. SHAW, JR 2,782,832

BENDING MACHINES

Filed April 26, 1955 7 Sheets-Sheet 5

INVENTOR:
Ralph M. Shaw, Jr.,

BY Paul & Paul

ATTORNEYS.

INVENTOR.
Ralph M. Shaw, Jr.,
BY Paul & Paul
ATTORNEYS.

Feb. 26, 1957 R. M. SHAW, JR 2,782,832

BENDING MACHINES

Filed April 26, 1955 7 Sheets-Sheet 7

INVENTOR.
Ralph M. Shaw, Jr.,
BY Paul & Paul
ATTORNEYS.

United States Patent Office
2,782,832
Patented Feb. 26, 1957

2,782,832

BENDING MACHINES

Ralph M. Shaw, Jr., Edgewater Park, N. J., assignor to Pedrick Tool and Machine Co., Philadelphia, Pa., a corporation of Pennsylvania Application April 26, 1955, Serial No. 504,009

3 Claims. (Cl. 153—46)

This invention relates to bending machines. More specifically, it is concerned with bending machines generally of the type disclosed in the U. S. Patent 2,369,923 granted to me on February 20, 1945 in which a swaging shoe cooperates with a stationarily-supported die element in angularly bending work pieces of rod or bar material. In the patented machine, it is necessary to insert the shoe manually in preparation for each bending operation and to remove it manually at the completion of each such operation. This placement and removal of the swaging shoe is not only time consuming, but apt to result in injury to a careless machine operator.

The chief aim of my invention is to overcome the above mentioned drawbacks with a view to enable accomplishment of the bending more quickly and accurately in such machines without requiring any attention on the part of the operator other than of placing the work in the machine and removing it after the bending.

How the foregoing and other objectives and advantages are realized in practice will appear from the following detailed description of the attached drawings, wherein.

Figure 1:
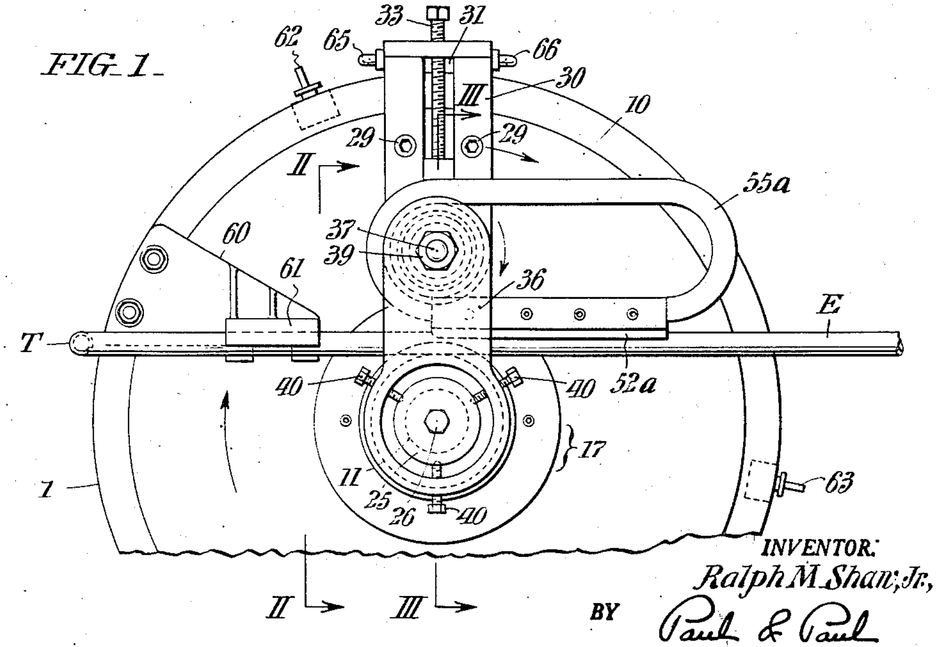
Fig. 1 is a fragmentary view in top plan of a bending machine conveniently embodying my invention.
Figure 2:
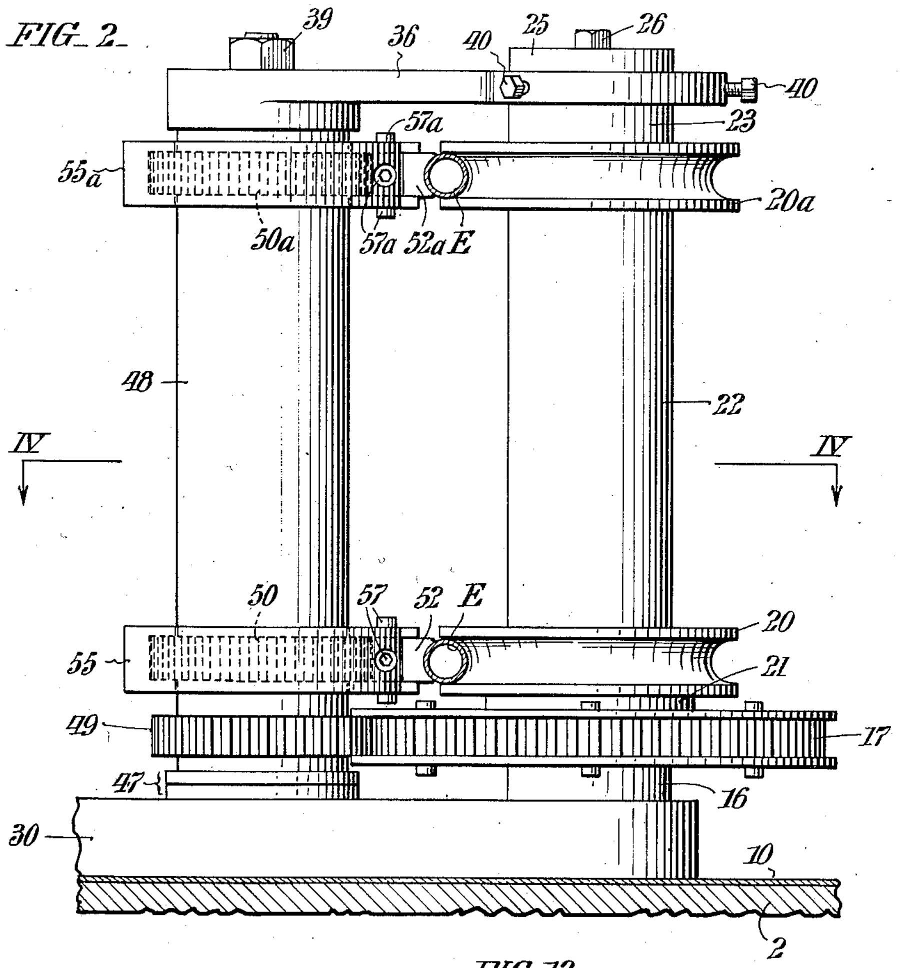
Figs. 2 and 3 are fragmentary views in vertical section taken as indicated respectively by the angled arrows II—II and III—III in Fig. 1.

As herein exemplified, my improved bending machine has a circular bed 1 which is intended to be supported at table height by a suitable base (not shown). Recessed into the bed 1 from above is a bull gear 2 of the spur type which is free to revolve about a tubular stud 3 set axially into the bed, said stud having a stop flange 4 at the bottom and being secured in place by the cap screws designated 5. The bull gear 2 is arranged to be driven by an intermeshing pinion 6 (Fig. 4) recessed into an offset 7 of the bed 1. The pinion 6 is keyed to a shaft 8 which passes down through the bed and which may be driven either manually or by an electric motor (not illustrated). Affixed to the top of the bull gear is a plate 2 or disk 10 which is centrally apertured to clear the protruding upper end of the stud 3. The post indicated at 11 has, below a stop flange 12, a diametrically reduced bottom end portion 13 that fits downwardly into the hollow of the tubular stud 3 and is constrained against rotation in the stud by a spline 14. Secured to the post 11 by a key 15 and upwardly spaced from the flange 12 by a collar 16, is a spur wheel 17. Similarly keyed to the post as at 18, 18*a* are two circumferentially-grooved circular die elements 20, 20*a*, the lower one of these being vertically spaced from the spur wheel 17 by a collar 21, said elements being vertically spaced from each other in turn by an interposed sleeve 22. Above the upper die element 20*a* is a collar 23 which is held in place by a cap piece 25 secured to the top of the post by a screw bolt 26. Fulcrumed about the upper protruding end of the stud 3 and secured by cap screws 29 to the bull gear 2, is a member in the form of an arm 30 having a longitudinal slot 31 for guidance of a slide block 32 which is adjustable along said arm by means of the screw shaft indicated at 33. Upon the slide 32 is mounted a tubular post 35 which is clamped between said slide and the distal end of another radial arm 36 by an axial bolt 37. As shown, the polygonal head 38 of the bolt 37 is upwardly recessed into the slide 32 from the bottom of the latter and is provided at its upper protruding threaded end with a nut 39 that bears downwardly upon the arm 36. From Figs. 1 and 3 it will be noted that the arm 36 is secured, with capacity for adjustment at its fulcrum end by means of set screws 40, to a ring 41 which is free to revolve in an annular groove jointly provided by the collar 23 on the post 11 and the cap disk 25 at the top of said post. Freely rotative about bearing bushings 45 and 46 at the bottom and top ends of the tubular post 35 and supported on a ball bearing 47 is a sleeve 48 having integrally formed therewith, adjacent its lower end, a spur pinion 49 which meshes with the fixed spur gear 17 on the post 11. Also integrally formed with the sleeve 48 at the levels of the die elements 20 and 20*a* are two spur pinions 50 and 50*a* respectively of the same size as the pinion 49.

Figure 3:
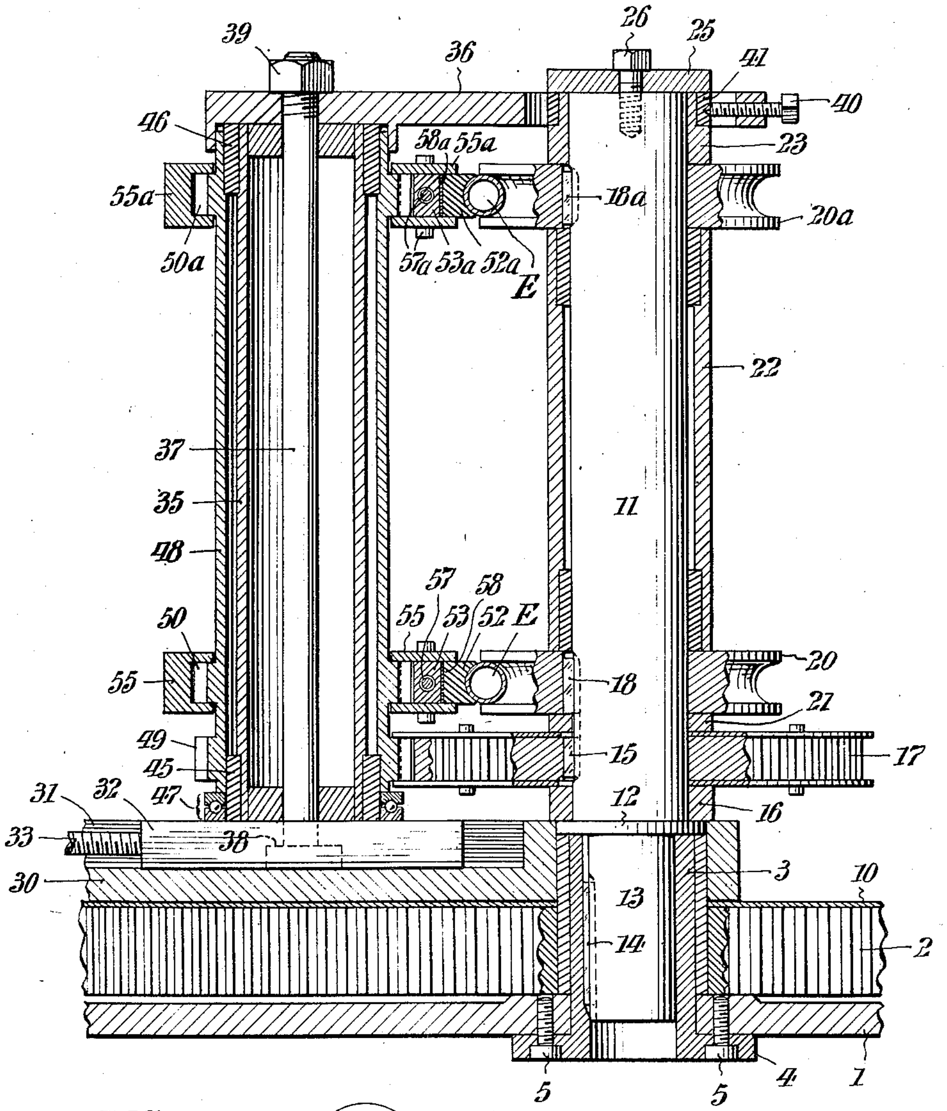
Figure 8:
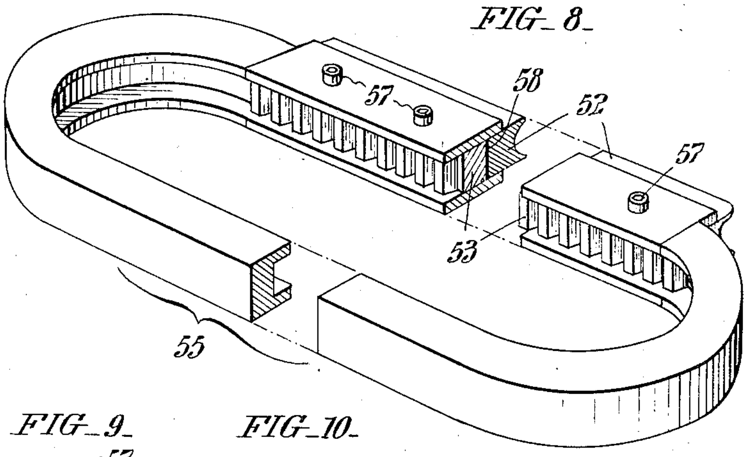
Fig. 8 is a broken out perspective view of one of the bending elements of the machine.
Figures 9, 10:
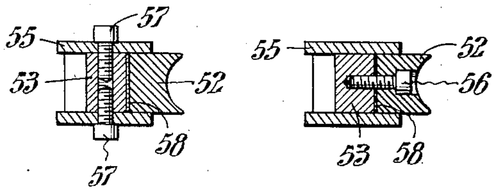
Figs. 9 and 10 are detail views in cross section taken as indicated respectively by the angled arrows IX—IX and X—X in Fig. 6.
Figure 6:
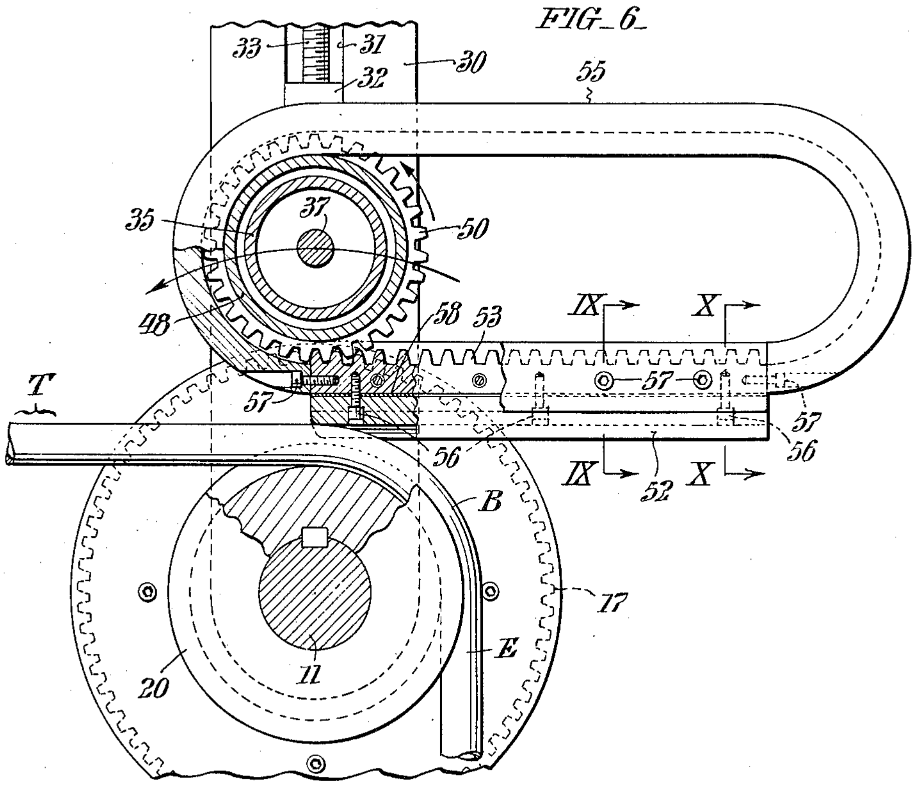
Figs. 6 and 7 are fragmentary views in horizontal section, similar to Figs. 4 and 5, showing successive positions through which the bending elements move in their return to starting position for release of the work piece after it has been bent in the machine.
Figure 7:
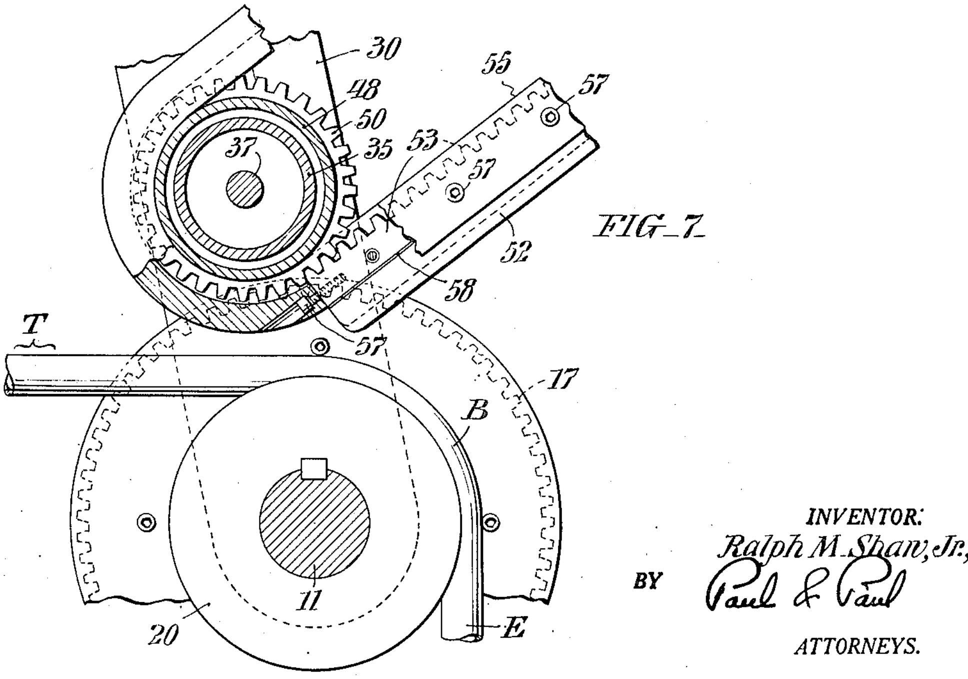
Figure 15:
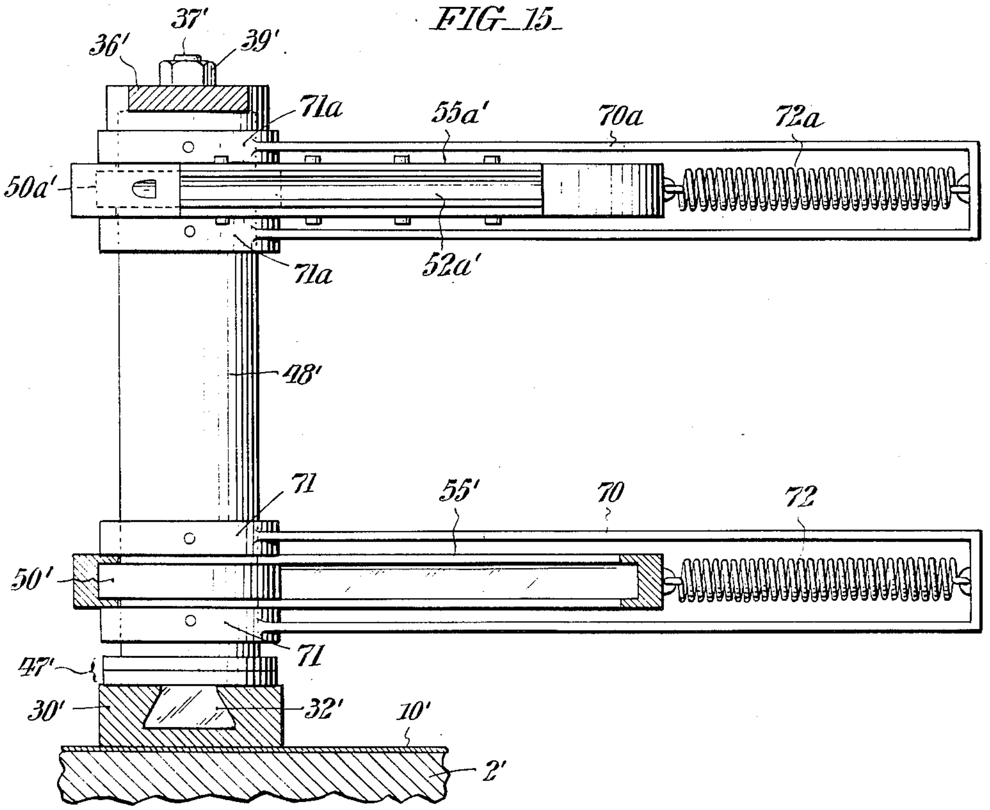
Figure 14:
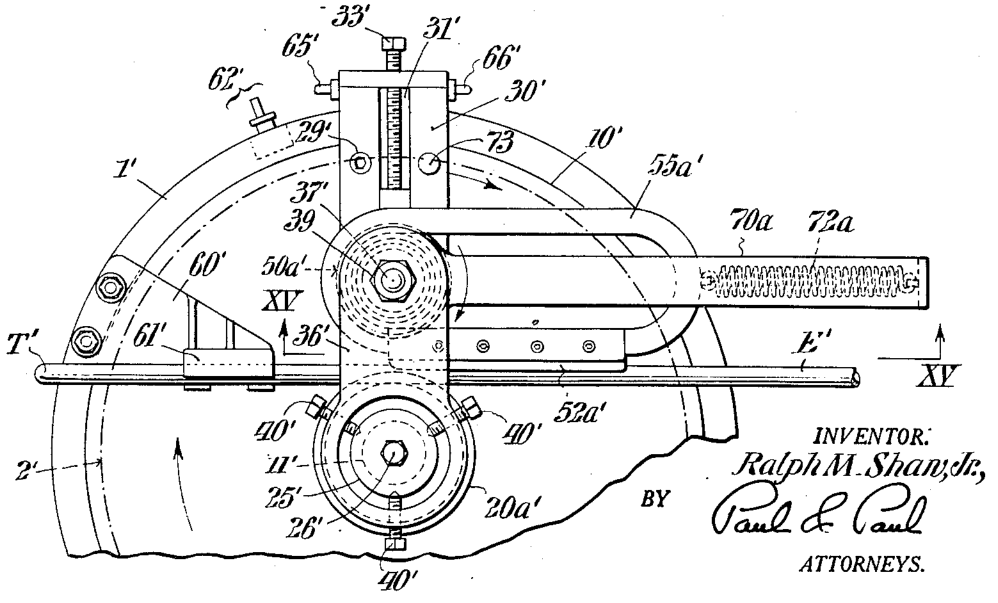
Figures 16, 17:
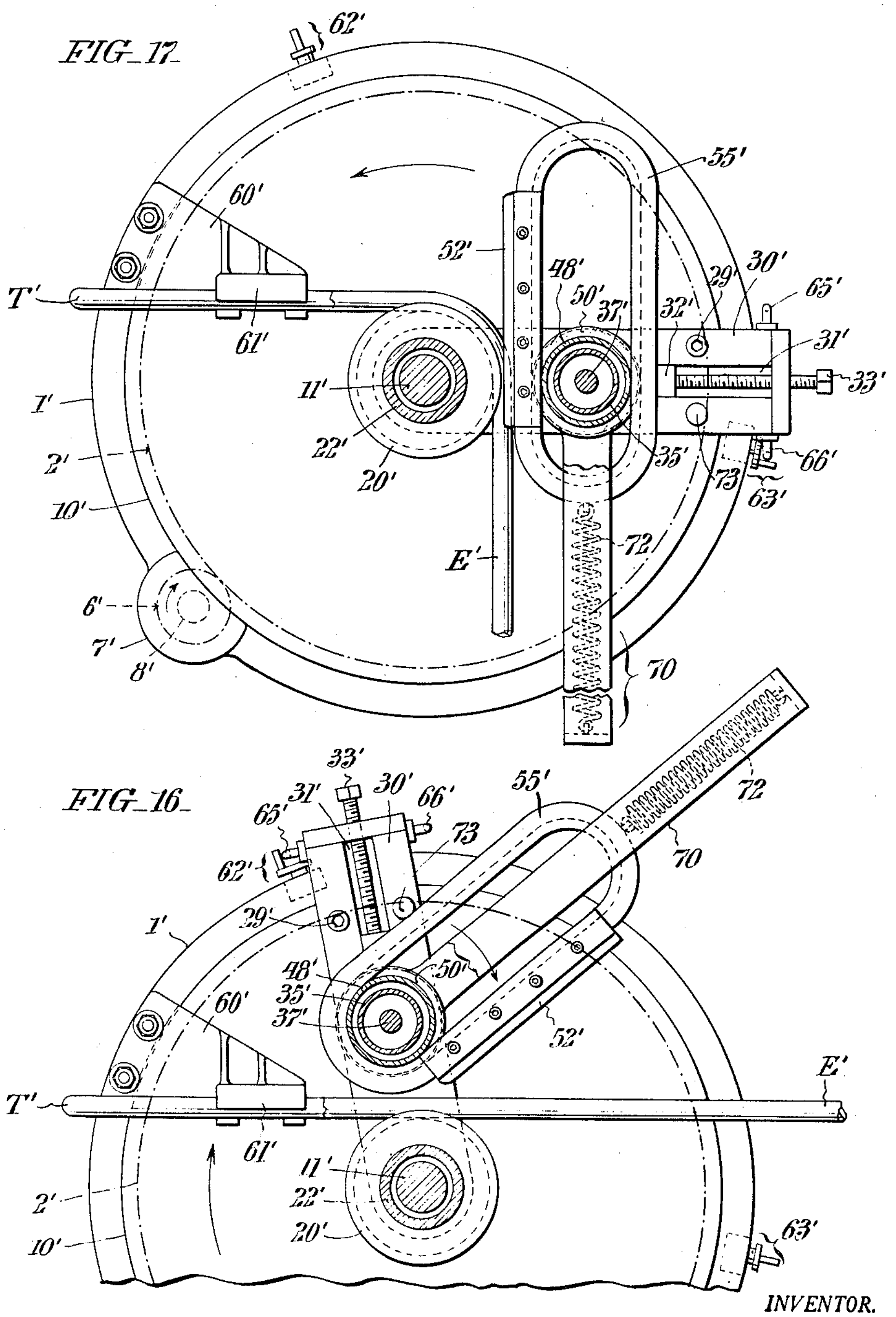

For cooperation with the die elements 20 and 20*a* in the bending, I have provided two complementally grooved swaging shoes 52 and 52*a* which, respectively, are secured to rack bars 53 and 53*a* set into corresponding straight sides of elongate loop shaped members 55 which surround the sleeve 48 with said rack bars meshing with the pinions 50 and 50*a*. As instanced in Figs. 8–10, the members 55 and 55*a* are of channel configuration in cross section and are held to the spur pinions 50 and 50*a* by lap of their flanges over said pinions as best seen in Fig. 3. As further instanced in Figs. 8–10 and in Fig. 6 as well, the shoes 52 and 52*a* are secured, with interposition of shims 58, to the corresponding rack bars 53 and 53*a* by cap screws 56, and said rack bars to the loop members 55 and 55*a* by cap screws 57 and 57*a*.

For the support of the work pieces during the bending, I have provided an upstanding bracket 60 which is bolted fast to the rim of the bed 1 and which, at the level of the die elements 20 and 20*a*, is provided with holders or grippers 61.

The extent of rotation of the bull wheel 2 is limited by stops 62 and 63 adjustably secured to the edge of the bed 1 and adapted to be engaged by projections 65 and 66 at opposite sides of the distal end of the arm 30. If the machine is driven electrically, the stops 62 and 63 may be in the form of limit switches in circuit with the driving motor.

*Operation*

Figure 4:
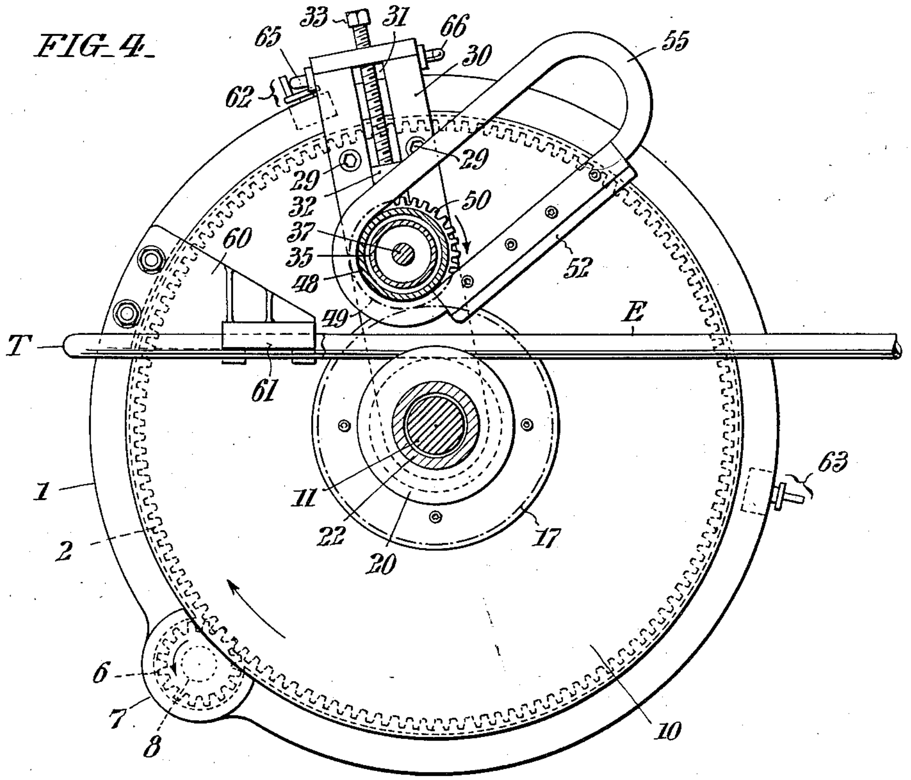
Fig. 4 is a view in horizontal section taken as indicated by the angled arrows IV—IV in Fig. 2 and showing the machine set in readiness for a bending operation.
Figures 11, 12:
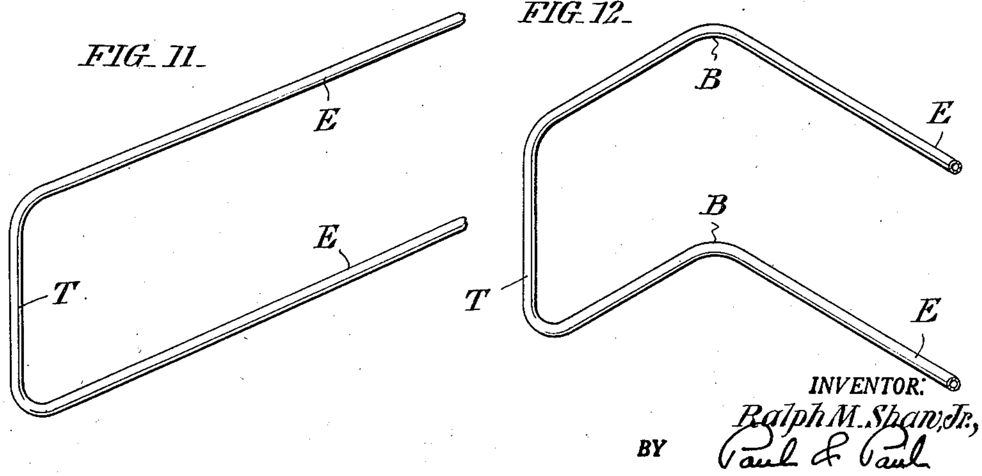
Fig. 11 is a perspective view of a work piece bent for the bending of which the machine is particularly adapted.
Figs. 12 and 13 are views similar to Fig. 11 showing the work piece after successive bendings in the machine.
Figure 5:
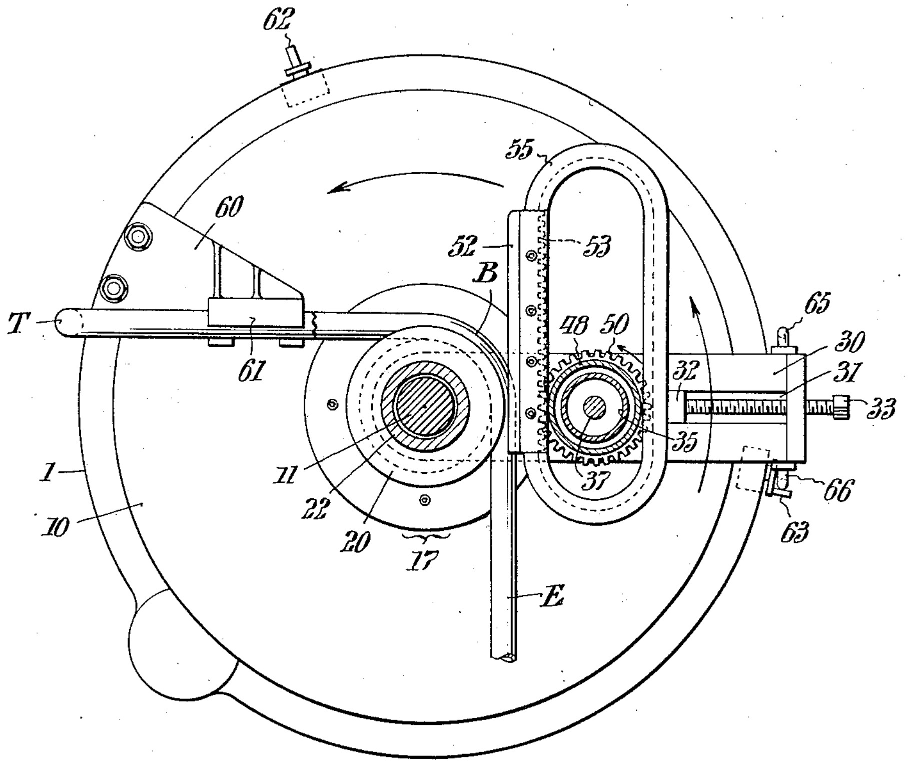
Fig. 5 is a view similar to Fig. 4 showing the machine at the end of a bending cycle.

For use, for example, in angularly bending the leg portions of U-shaped work pieces T such as shown in Fig. 11 preformed from tubular or bar material, the operation of the machine is as follows:

With the rotatable member or arm 30 engaging the stop 62 and the shoe-carrying members 55, 55a in retracted position as shown in Fig. 4, the legs of the work piece T are engaged in the holders or grippers 61 of the bracket 60 such that the end portions of the legs extend beyond the die elements 20 and 20a and contact tangentially with the latter as also shown in Fig. 4. With this preparation, the machine is set into motion, i. e., the bull gear 2 and the attached plate 10 and arm 30 are together moved clockwise or in the direction of the arrow in Fig. 4. As the operation proceeds, the spur pinion 49 rolls on the fixed gear 17, with the result that the sleeve 48 is turned and, through the locked engagement at this time of the pinions 50 and 50a thereon with the racks 53 and 53a of the loop members 55 and 55a, said members are bodily swung clockwise simultaneously until the face of the swaging shoes contact fully with the distal end portions of the work piece T as in Fig. 1. Upon continued rotation of the bull gear 2 thereafter, endwise movement is imparted to the loop members 55 and 55a through cooperation of the pinions 50 and 50a with the racks 53 and 53a until the arm 30 is arrested by contact with the stop 63 as shown in Fig. 5, the shoes 52 and 52a being maintained all the while in tangential relation to the die elements 20 and 20a. Accordingly, the bending is accomplished solely by pressure action of the shoes 52 and 52a upon the work piece T and the distal end portions E of the latter are bent, in this instance, through a right angle as shown in Fig. 12, the arcs at the regions B of the bending corresponding to the circumferential curvature of the die elements 20 and 20a. At the completion of the bending, the machine is driven reversely, i. e., the bull gear 2 is turned counterclockwise as indicated by the arrow in Fig. 5 until the parts are restored to their initial positions of Fig. 1, with are arm 30 arrested by the stop 62 and the loop members 55 and 55a fully retracted out of the way to facilitate removal of the work piece from the machine.

Figure 13:
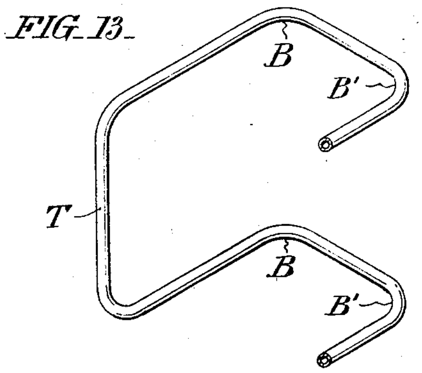

Additional bends such as at B′, B′ in Fig. 13 can be made in the work piece by re-inserting it in the machine in an obvious manner and repeating the operation above described. Moreover, by substituting longer loop members with correspondingly longer swaging shoes and adjusting the stops 62 and 63, it is evident that bends can be made through angles greater than ninety degrees.

It will be further evident that simple straight-away bar or tube lengths can be simultaneously bent in the machine by inserting them respectively into the holders or gripper 61 of the bracket 60 and thereafter following the same procedure as before.

Having thus described my invention, I claim:

1. In a bending machine, a circular die element and a coaxial spur wheel both fixedly supported; a member rotatable about the common axis of the die element and the spur wheel as a center; a stationary holder for sustaining a work piece in the form of a tube or bar with a free end portion thereof tangential to the die element; a shaft free to revolve about an axis on the rotatable member disposed in eccentric relation to the axis of the die element; a spur pinion fast on the shaft and adapted to roll on the fixed spur wheel; a second spur pinion also fast on the shaft; and a straight sided elongate loop shaped member having rack teeth internally of one straight side in mesh with the second mentioned spur pinion, and a swaging shoe externally of said one side, whereby, as the rotatable member is turned, the loop element is swung about the shaft from a normally retracted position until the face of the shoe contacts fully with the work piece, and is thereafter pivotally shifted for maintenance of the shoe in tangential relation to the die element in causing the distal end of the work piece to be bent around the die element by pressure action.

2. In a bending machine, a pair of spaced circular co-axial die elements and a co-axial spur wheel both fixedly supported; a member rotatable about the common axis of the die elements and the spur wheel as a center; holder means for sustaining a U-shaped work piece of bar material with free end portions of its legs tangential to the respective die elements; a shaft free to revolve about an axis on the rotatable member disposed in eccentric relation to the axis of the die elements; a spur pinion fast on the shaft and adapted to roll on the fixed spur gear; a pair of other spur pinions secured to the shaft respectively in the planes of the die elements; and a pair of straight sided elongate loop shaped elements each having rack teeth internally of one straight side in mesh with one of the aforesaid pair of spur pinions and a swaging shoe externally of said one side, whereby, as the rotatable member is acuated the shaft is turned and the loop elements are simultaneously swung from a normally retracted position until the shoe faces contact fully with the distal end portions of the work piece, and are thereafter pivotally shifted for maintenance of the shoes in tangential relation with the die elements in causing the distal end portions of the work piece to be bent around the die elements by pressure action.

3. In a bending machine, a circular bed; a bull gear wheel rotative about an upstanding stud axially of the bed; means for driving the bull wheel; a radial arm on the bull wheel movable about the stud; a stationary spur wheel affixed to the stud above the bull wheel; a circular die element secured upon the stud above the arm; a stationary holder bracket affixed to the bed for sustaining a work piece in the form of a tube or bar with a free end portion thereof tangential to the die element; a shaft free to revolve about an axis on the arm disposed in eccentric relation to the axes of the die element; a spur pinion fast on the shaft and adapted to roll on the fixed spur wheel; a second pinion also fast on the shaft; a straight-sided elongate loop-shaped member having rack teeth internally of one straight side in mesh with the second mentioned spur pinion; a swaging shoe externally of said one side, whereby, as the arm is turned, the loop element is swung about the shaft from a normally retracted position until the face of the shoe contacts fully with the work piece, and is thereafter pivotally shifted for maintenance of the shoe in tangential relation to the die element in causing the distal end of the work piece to be bent around the die element by pressure action; and stops adjustable around the edge of the table and adapted to be engaged by the arm to limit the movement thereof about the stud.

References Cited in the file of this patent

UNITED STATES PATENTS

| | | |
|---|---|---|
| 1,606,096 | Oddie | Nov. 9, 1926 |
| 1,751,492 | Nowakowski | Mar. 25, 1930 |
| 2,190,423 | Henricson | Feb. 13, 1940 |
| 2,350,379 | Weightman | June 6, 1944 |
| 2,369,923 | Shaw | Feb. 20, 1945 |
| 2,482,617 | Green | Sept. 20, 1949 |

FOREIGN PATENTS

| | | |
|---|---|---|
| 465,152 | Great Britain | May 3, 1937 |